US008300424B2

(12) United States Patent
Wright et al.

(10) Patent No.: US 8,300,424 B2
(45) Date of Patent: Oct. 30, 2012

(54) MOUNTING BRACKET FOR USE WITH A COMPUTER AND METHOD OF ASSEMBLING A COMPUTER

(75) Inventors: Jerry Wright, Huntsville, AL (US); David L. McDonald, Lacey's Spring, AL (US)

(73) Assignee: GE Intelligent Platforms Embedded Systems, Inc., Charlottesville, VA (US)

( * ) Notice: Subject to any disclaimer, the term of this patent is extended or adjusted under 35 U.S.C. 154(b) by 763 days.

(21) Appl. No.: 12/277,430

(22) Filed: Nov. 25, 2008

(65) Prior Publication Data
US 2010/0128424 A1 May 27, 2010

(51) Int. Cl.
*H05K 7/14* (2006.01)
(52) U.S. Cl. .................................................. 361/796
(58) Field of Classification Search .......... 361/730–732, 361/740, 741, 747, 752, 754, 756, 759, 796–798, 361/801–802, 825; 174/260
See application file for complete search history.

(56) References Cited

U.S. PATENT DOCUMENTS 5,774,343 A * 6/1998 Benson et al. ............... 361/796

OTHER PUBLICATIONS

"IEEE Standard for a Common Mezzanine Card (CMC) Family", IEEE Std 1386-2001, Microprocessor & Microcomputer Standards Committee (MMSC) of the IEEE Computer Society, The Institute of Electrical and Electronics Engineers, Inc., 3 Park Avenue, New York, NY 10016-5997, USA.

\* cited by examiner

*Primary Examiner* — Jeremy Norris
*Assistant Examiner* — Tremesha S Willis
(74) *Attorney, Agent, or Firm* — GE Global Patent Operation; Catherine J. Toppin

(57) ABSTRACT

A mounting bracket for securing a mezzanine card in a stacked single board computer includes a main body that includes a first end, an opposite second end, a first side surface, and an opposite second side surface. The main body is sized to be positioned along a side surface of the mezzanine card, wherein the first side surface or the second side surface contacts the side surface of the mezzanine card to facilitate securing the side surface of the mezzanine card with respect to a top PCB. The mounting bracket also includes a first arm formed at the first end of the main body, a second arm formed at the second end of the main body, and at least one top rail coupled to the main body, wherein the top rail is configured to secure a top surface of the mezzanine card with respect to a top PCB.

18 Claims, 7 Drawing Sheets

MOUNTING BRACKET FOR USE WITH A COMPUTER AND METHOD OF ASSEMBLING A COMPUTER

BACKGROUND OF THE INVENTION

The subject matter disclosed herein relates generally to assembling single board computers and, more particularly, to installing peripheral component interconnect (PCI) mezzanine cards (PMC) in stacked single board computers.

Some known computers use a stacked card configuration in order to increase a computer's capabilities without changing the form factor. To prevent the computer from becoming too large, peripheral cards are added. However, installing and/or removing a card from such a configuration requires that a top card be removed in order to access a bottom card. Moreover, the Institute of Electrical and Electronics Engineers, Inc. (IEEE) Standard for a Common Mezzanine Card (CMC) Family, i.e., IEEE Std. 1386-2001, provides the physical dimensions and features of a CMC and host slot mechanics. The IEEE standard defines a means for attaching the CMC to the host printed circuit board (PCB) by means of four mounting screws inserted through the opposite side of the host PCB.

For example, FIGS. 1-3 are perspective views of a known stacked single board computer card configuration 100. Computer card configuration 100 includes a top PCB 102 and a bottom PCB 104. Bottom PCB 104 is coupled to top PCB 102 using a plurality of screws 106. More specifically, bottom PCB 104 is coupled to top PCB 102 using one or more screws 106 at each corner of bottom PCB 104 and one screw 106 in the middle of bottom PCB 104. However, in order to, for example, install a PMC 108 in computer card configuration 100, top PCB 102 must be disassembled from bottom PCB 104 in order to access PMC mounting screws 110.

Accordingly, it is desirable to provide a method for installing a PMC in a dual slot stacked single board computer configuration. Moreover, it is desirable to provide an apparatus for use in securing a PMC in such a configuration.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a mounting bracket is provided for securing a mezzanine card in a stacked single board computer that includes a top printed circuit board (PCB) and a bottom printed circuit board (PCB). The mounting bracket includes a main body that includes a first end, a second end that is opposite the first end, a first side surface, and a second side surface that is opposite the first side surface. The main body is sized to be positioned along a side surface of the mezzanine card, wherein one of the first side surface and the second side surface contacts the side surface of the mezzanine card to facilitate securing the side surface of the mezzanine card with respect to the top PCB. The mounting bracket also includes a first arm formed at the first end of the main body, a second arm formed at the second end of the main body, and at least one top rail coupled to the main body, wherein the top rail is configured to secure a top surface of the mezzanine card with respect to the top PCB.

In another aspect, a method is provided for assembling a stacked single board computer that includes a top printed circuit board (PCB) and a bottom printed circuit board (PCB), wherein the top PCB includes at least one mezzanine card. The method includes coupling the mezzanine card to the top PCB, and positioning a retaining rail along a first side surface of the mezzanine card, wherein the retaining rail includes a main body having a first arm formed at a first end of the main body and a second arm formed at a second end of the main body. The method also includes inserting the first arm into the top PCB such that a notch formed in the first arm interferes with a corresponding slot formed in the top PCB and positioning at least one top rail of the retaining rail with respect to a top surface of the mezzanine card.

Another aspect provides a stacked single board computer that includes a first printed circuit board (PCB) and a second printed circuit board (PCB) positioned adjacent to the first PCB. The first PCB includes at least one mezzanine card that is secured by at least one retaining rail that includes a main body including a first end, a second end that is opposite to the first end, a first side surface, and a second side surface that is opposite to the first side surface. The main body is sized to be positioned along a side surface of the mezzanine card, such that one of the first side surface and the second side surface contacts the side surface of the mezzanine card to facilitate securing the side surface of the mezzanine card with respect to the first PCB. The retaining rail also includes a first arm formed at the first end of the main body, a second arm formed at the second end of the main body, and at least one top rail coupled to the top surface of the main body, wherein the at least one top rail is configured to secure a top surface of the mezzanine card with respect to the first PCB.

BRIEF DESCRIPTION OF THE DRAWINGS

The embodiments described herein may be better understood by referring to the following description in conjunction with the accompanying drawings.

DETAILED DESCRIPTION OF THE INVENTION

Described in detail herein are exemplary embodiments of methods and apparatus that facilitate providing a means to install and secure a PMC without detaching a multi-slot carrier assembly within a stacked single board computer. Providing such a means facilitates an ability to remove a PMC without disassembling the computer. Moreover, reconfiguring PMC sites that use such a configuration may require less time for service personnel. Similarly, such a configuration may require less time to manufacture, thereby providing additional production efficiency.

Figure 1:
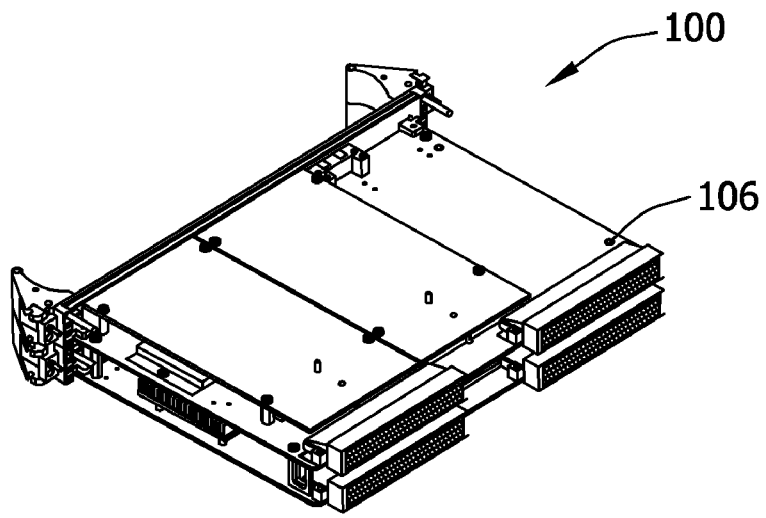
FIG. 1 is a perspective view of a known stacked single board computer.
Figure 2:
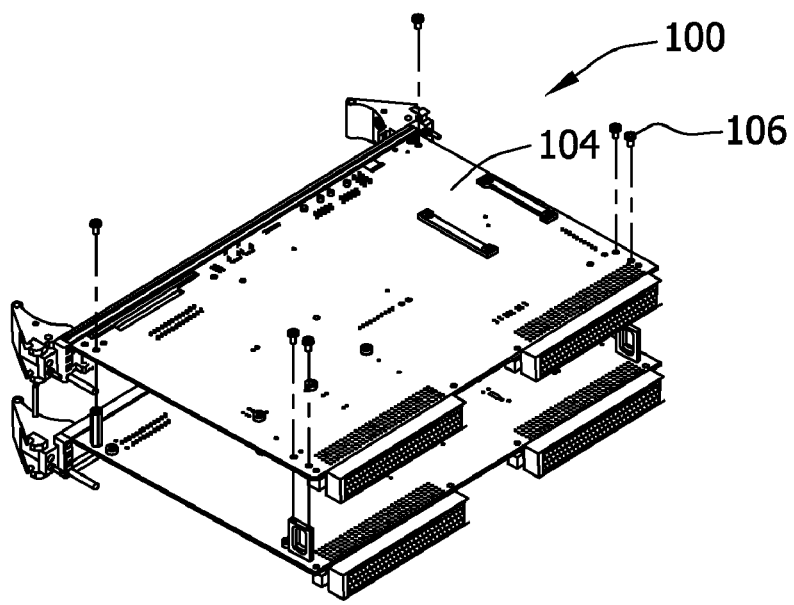
FIG. 2 is a perspective view of the computer shown in FIG. 1 in which a bottom PCB is being removed from a top PCB.
Figure 3:
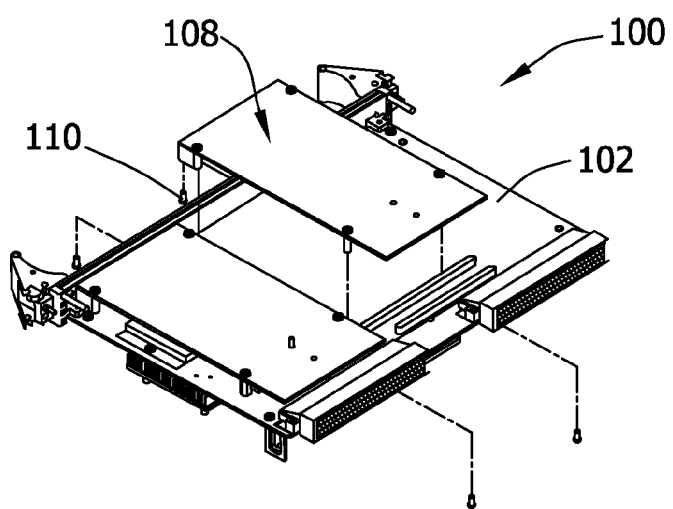
FIG. 3 is a perspective view of the computer shown in FIGS. 1 and 2 in which a PMC is being removed from the top PCB.
Figure 4:
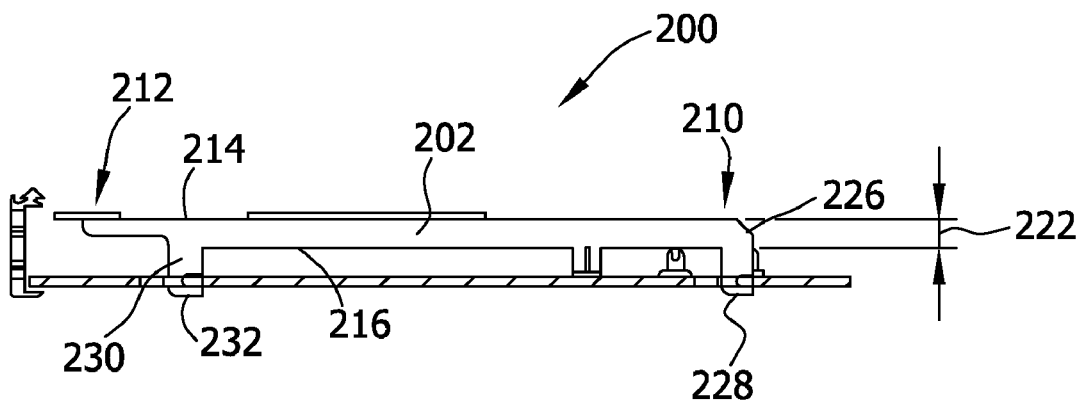
FIG. 4 is a side view of an exemplary mounting bracket or retaining rail that may be used to secure a PMC in a stacked single board computer.
Figure 5:
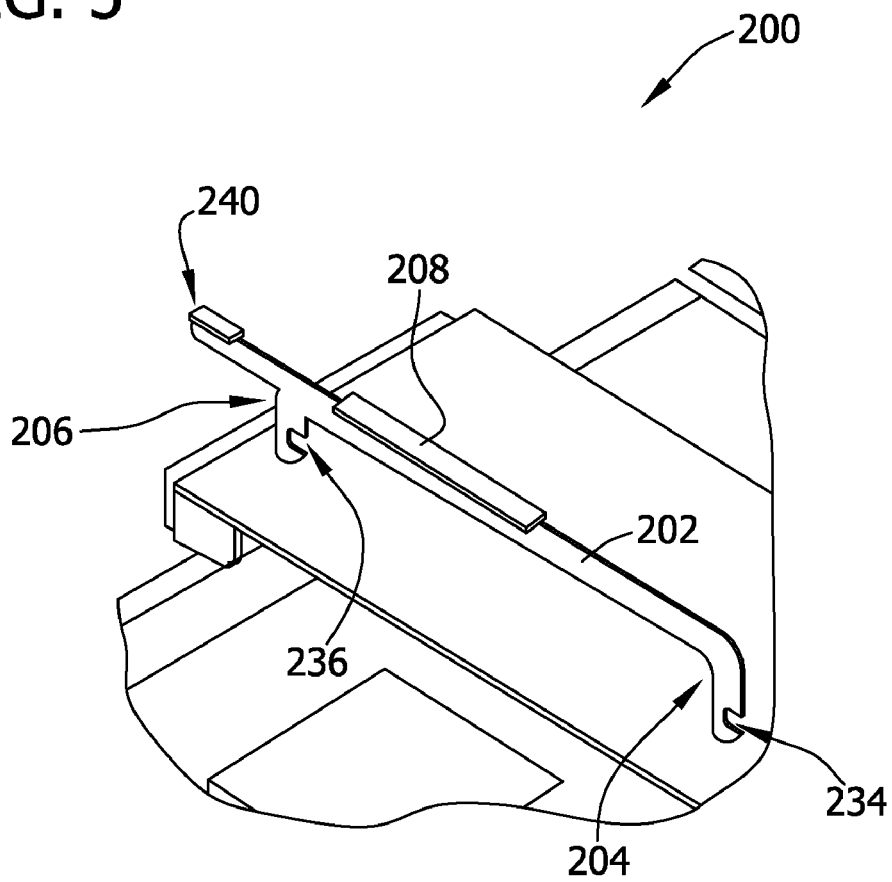
FIG. 5 is a perspective view of the retaining rail shown in FIG. 4.
Figure 6:
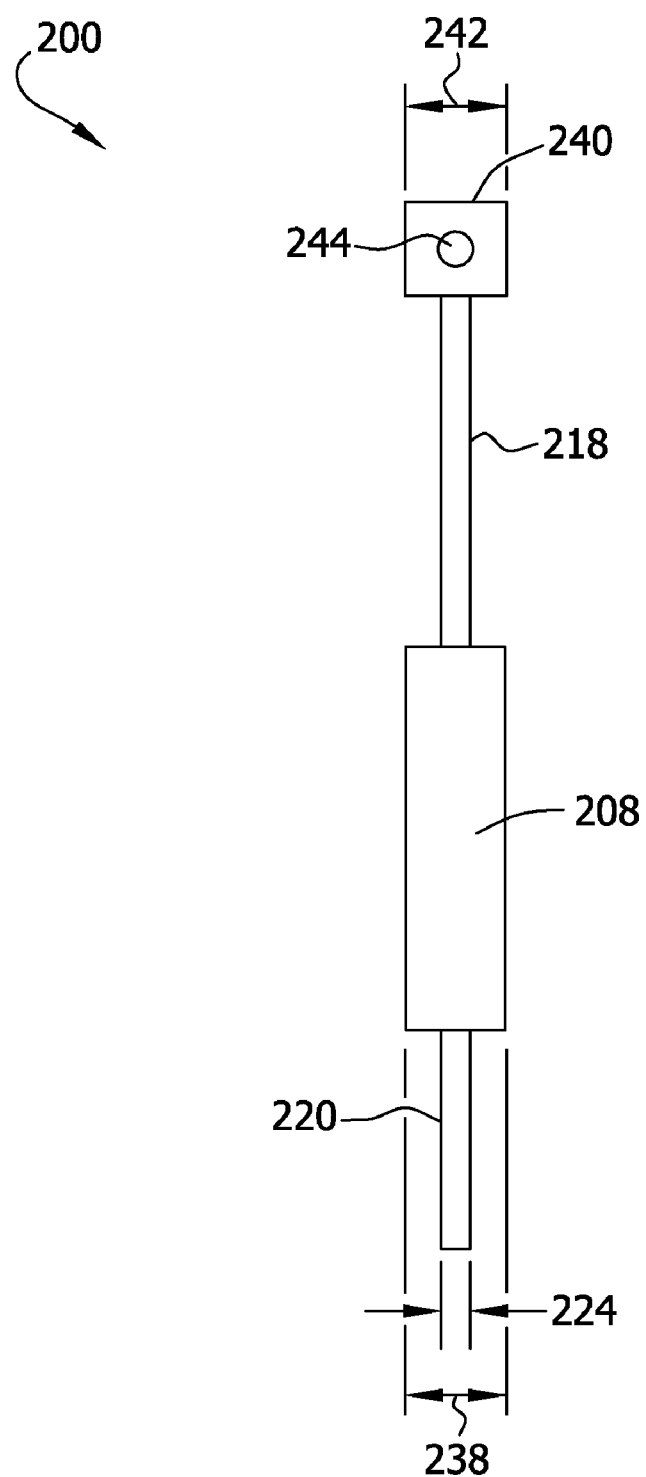
FIG. 6 is a top view of the retaining rail shown in FIG. 4.

FIG. 4 is a side view of an exemplary mounting bracket or retaining rail 200 that may be used to secure a PMC in a stacked single board computer. FIG. 5 is a perspective view of retaining rail 200 and FIG. 6 is a top view of retaining rail 200. Referring to FIGS. 4-6, and in the exemplary embodiment, retaining rail 200 includes a main body 202, a first arm 204, a second arm 206, and at least one top rail 208. More specifically, main body 202 includes a first end 210 and an opposite second end 212. In one embodiment, main body 202 also includes a top surface 214, an opposite bottom surface 216, a first side surface 218, and a second side surface 220 opposite first side surface 218. First and second side surfaces 218 and 220 are oriented perpendicular to top and bottom surfaces 214 and 216, thereby defining a rectangular cross-section of main body 202. Main body 202 also has a thickness 222 measured from top surface 214 to bottom surface 216 and a width 224 measured from first side surface 218 to second side surface 220. In an alternative embodiment, main body 202 defines an oblong having width 224 that varies between top surface 214 and bottom surface 216. In another alternative embodiment, main body 202 defines a beam.

In the exemplary embodiment, first arm 204 is formed at first end 210 and second arm 206 is formed at second end 212. In certain embodiments, first arm 204 and second arm 206 are integrally formed with main body 202. In an alternative embodiment, first arm 204 and/or second arm 206 are formed separately from and coupled to main body 202. In the exemplary embodiment, first arm 204 includes a first end 226 and a second end 228 that is opposite first end 226. Similarly, second arm 206 includes a first end 230 and a second end 232 that is opposite first end 230. First arm 204 and second arm 206 are coupled to main body bottom surface 216 at first end 226 and second end 230, respectively. Moreover, first arm 204 includes a notch 234 at second end 228, and second arm 206 includes a notch 236 at second end 232. Each arm 204 and 206 is sized to be inserted into a corresponding slot in a PCB that is positioned adjacent the mezzanine card being secured using retaining rail 200 such that each notch 234 and 236 interferes with the corresponding slot.

In the exemplary embodiment, top rail 208 is coupled to main body top surface 214 such that top rail 208 extends outwardly from main body 202 parallel to top surface 214, and has a width 238 that is larger than main body width 224. In certain embodiments, top rail 208 is formed integrally with main body 202. Moreover, in the exemplary embodiment, a mounting plate 240 is coupled to main body top surface 214 at second end 212. In certain embodiments, mounting plate 240 is integrally formed with main body 202. In the exemplary embodiment, mounting plate 240 extends outwardly from main body 202 parallel to top surface 214, and has a width 242 that is larger than main body width 224. In one embodiment, mounting plate width 242 is smaller than top rail width 238. In an alternative embodiment, mounting plate width 242 is larger than top rail width 238. In the exemplary embodiment, mounting plate 240 defines one or more mounting apertures 244 that are sized to receive a suitable mounting screw (not shown).

Figure 7:
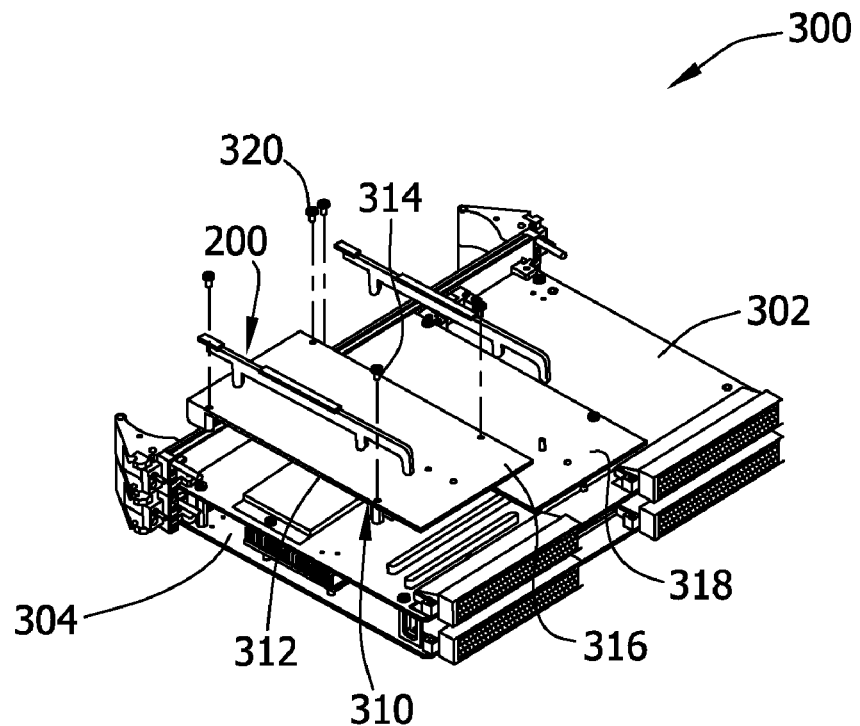
FIG. 7 is a perspective view of a stacked single board computer that includes the retaining rail shown in FIGS. 4-6.
Figure 8:
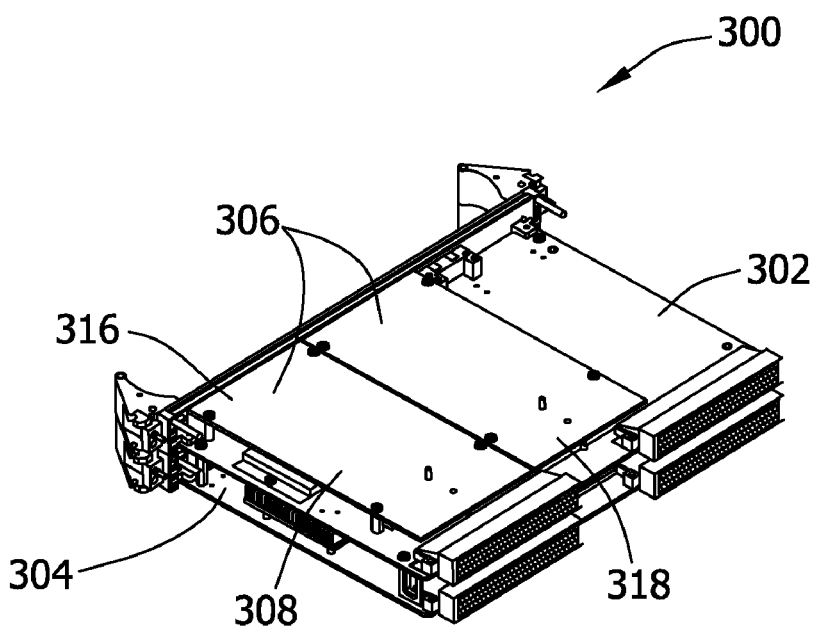
FIG. 8 is a perspective view of the computer shown in FIG. 7.
Figure 9:
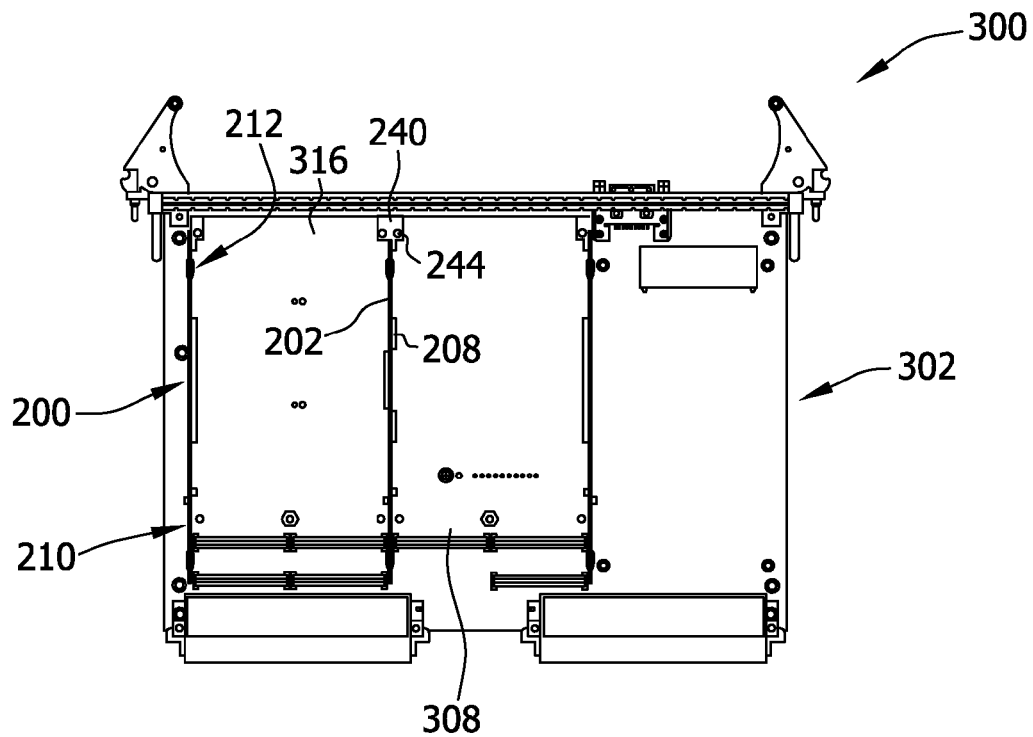
FIG. 9 is a top view of the computer shown in FIG. 7.
Figure 10:
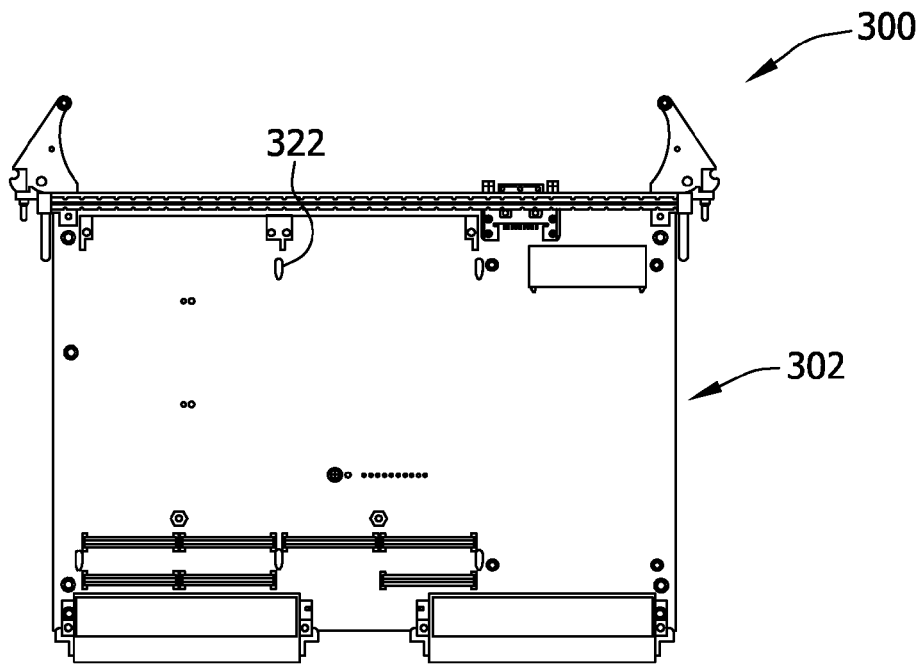
FIG. 10 is a top view of the computer shown in FIG. 7 without retaining rails.

FIG. 7 is a perspective view of a stacked single board computer 300 during assembly. FIG. 8 is a perspective view of computer 300 after assembly, FIG. 9 is a top view of computer 300 after assembly, and FIG. 10 is a top view of computer 300 without installed mezzanine cards. Referring to FIGS. 7-10, and in the exemplary embodiment, computer 300 includes a top PCB 302 and a bottom PCB 304. Top PCB 302 includes a plurality of mezzanine cards (PMCs) 306. Each PMC 306 includes a top surface 308 and an opposite bottom surface 310, as well as a first side surface 312 and a second side surface 314 that is opposite first side surface 312. Moreover, each PMC 306 is secured by at least one retaining rail 200. More specifically, each PMC 306 is secured to top PCB 302 using at least one retaining rail 200. In one embodiment, retaining rail 200 is sized such that retaining rail 200 may be inserted between two adjacent PMCs 306 with retaining rail first side surface 218 contacting first side surface 312 of a first PMC 318 and retaining rail second side surface 220 contacting second side surface 314 of a second PMC 316 adjacent first PMC 318. Retaining rail 200 effects a force on PMC 316 in a direction perpendicular to top surface 308 and/or bottom surface 310. Accordingly, each PMC 306 includes a component keepout area (not shown) at a periphery of top surface 308 and/or bottom surface 310. In addition, PMC top surface 308 is secured with respect to top PCB 302 by retaining rail top rail 208. Moreover, PMC top surface 308 is secured by suitable fasteners 320, such as screws, that are inserted through mounting hole 244 (shown in FIGS. 4-6) in mounting plate 240 (shown in FIGS. 4-6). Fasteners 320 are also inserted through PMC top surface 308. Further, each PMC 306 is secured within computer 300 via notches 234 and 236 (shown in FIGS. 4 and 5) located on retaining rail first arm 204 and second arm 206 (shown in FIGS. 4 and 5), respectively. More specifically, each arm 204 and 206 is sized to be inserted into top PCB 302 such that each notch 234 and 236 interferes with a corresponding slot 322 defined within top PCB 302.

Figure 11:
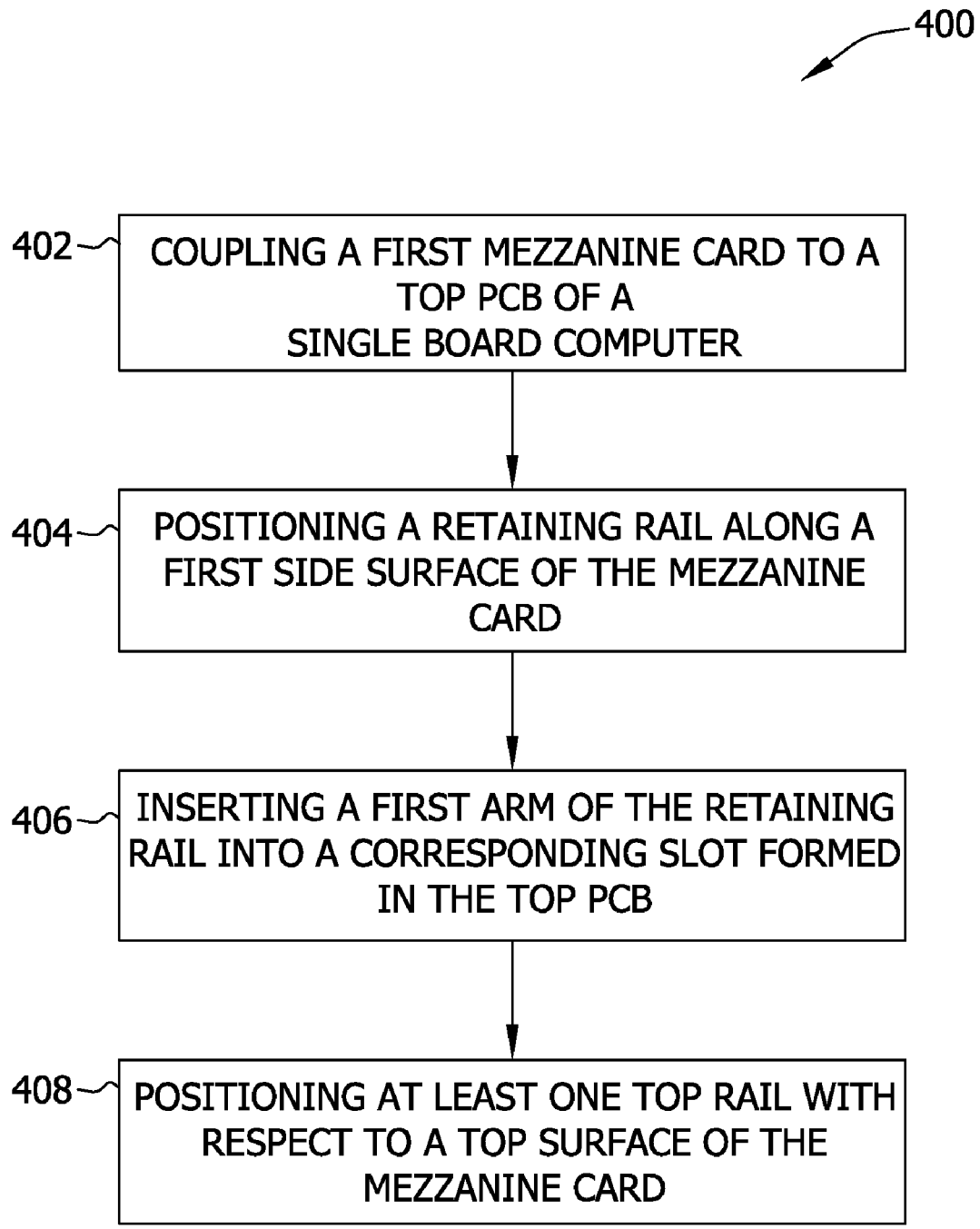
FIG. 11 is a flowchart illustrating an exemplary method of assembling the computer shown in FIGS. 7-10 using the retaining rail shown in FIGS. 4-6.

FIG. 11 is a flowchart 400 illustrating an exemplary method of assembling a stacked single board computer, such as computer 300 that includes top PCB 302 having at least one PMC 306 and bottom PCB 304 (each shown in FIGS. 7-10). In the exemplary embodiment, PMC 306 is coupled 402 to top PCB 302. Retaining rail 200 (shown in FIGS. 4-6) is then positioned 404 along first side surface 312 of PMC 306.

In the exemplary embodiment, first arm 204 (shown in FIGS. 4 and 5) and/or second arm 206 (shown in FIGS. 4 and 5) are inserted 406 into top PCB 302. More specifically, first arm 204 and/or second arm 206 are inserted into top PCB 302 such that notches 234 and/or 236 (both shown in FIGS. 4 and 5) of first arm 204 and second arm 206, respectively, interfere with a corresponding slot 322 (shown in FIG. 10) formed in top PCB 302 and extending therethrough. Thereafter, retaining rail top rail 208 (shown in FIGS. 4-6) is coupled 408 to top surface 308 (shown in FIGS. 7-9) of PMC 306.

In one embodiment, mounting plate 240 (shown in FIGS. 4-6) is coupled to top surface 308 of PMC 306. More specifically, one or more fasteners, such as mounting screws 320 (shown in FIG. 7), are inserted through mounting hole 244 (shown in FIGS. 5 and 6) that extends through mounting plate 240. Mounting screws 320 are also inserted into PMC 306 to secure PMC 306.

In one embodiment, a second retaining rail 200 is positioned along second side surface 314 of PMC 306. First arm 204 and/or second arm 206 are then inserted into top PCB 302 such that notches 234 and/or 236 interfere with a corresponding slot 322 formed in top PCB 302. Mounting plate 240 is then coupled to top surface 308 of PMC 306 using mounting screws 320.

In one embodiment, a second PMC 316 (shown in FIGS. 7-9) is inserted adjacent to first PMC 318 using the above-described steps. Retaining rail 200 is then positioned along first side surface 312 of second PMC 316. First arm 204 and/or second arm 206 are then inserted into top PCB 302 such that notches 234 and/or 236 interfere with a corresponding slot 322 formed in top PCB 302. Thereafter, retaining rail top rail 208 is positioned with respect to top surface 308 of second PMC 316. Then, mounting plate 240 may be coupled to top surface 308 of second PMC 316. More specifically, one or more fasteners, such as mounting screws 320, may be inserted through mounting hole 244 extending through mounting plate 240. Mounting screws 320 are also inserted into second PMC 316 to secure second PMC 316.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mounting bracket configured to secure a mezzanine card in a stacked single board computer having a printed circuit board (PCB), said mounting bracket comprising:
    a main body comprising a first end, a second end opposite said first end, a first side surface, and a second side surface opposite said first side surface, said main body sized to be positioned along only one side surface of the mezzanine card, one of said first side surface and said second side surface contacting the side surface of the mezzanine card to facilitate securing the side surface of the mezzanine card with respect to the top PCB;
    a first arm formed at said first end;
    a second arm formed at said second end; and
    at least one top rail coupled to said main body, said at least one top rail configured to secure a top surface of the mezzanine card with respect to the top PCB,
    wherein said first arm and said second arm are configured to be positioned in a substantially perpendicular direction relative to a top surface of the mezzanine card, and
    wherein at least one of said first arm and said second arm further comprises a notch configured to engage an upper surface and a lower surface of said top PCB.

2. A mounting bracket in accordance with claim 1, wherein at least one of said first arm and said second arm is integrally formed with said main body.

3. A mounting bracket in accordance with claim 1, wherein said first arm is formed at a first end to a bottom surface of said main body.

4. A mounting bracket in accordance with claim 3, wherein said notch is sized to interfere with a slot formed in the top PCB in order to secure said mounting bracket with respect to the top PCB.

5. A mounting bracket in accordance with claim 1, wherein said second arm is formed at a first end to a bottom surface of said main body.

6. A mounting bracket in accordance with claim 1, further comprising a mounting plate coupled to said main body, said mounting plate configured to couple said mounting bracket to the mezzanine card.

7. A mounting bracket in accordance with claim 6, wherein said mounting plate defines at least one mounting aperture sized to receive a fastener.

8. A method for assembling a stacked single board computer that includes a top printed circuit board (PCB) and a bottom printed circuit board (PCB), the top PCB including at least one mezzanine card, said method comprising:
    coupling the mezzanine card to the top PCB;
    positioning a retaining rail along only a first side surface of the mezzanine card, the retaining rail including a main body having a first arm formed at a first end of the main body and a second arm formed at a second end of the main body;
    inserting the first arm into the top PCB such that a notch formed in the first arm interferes with a corresponding slot formed in the top PCB, such that said first arm is substantially perpendicular to a top surface of the top PCB; and
    positioning at least one top rail of the retaining rail with respect to a top surface of the mezzanine card,
    wherein said notch is configured to engage an upper surface and a lower surface of said top PCB.

9. A method in accordance with claim 8, further comprising inserting the second arm into the top PCB such that a notch formed in the second arm interferes with a corresponding slot formed in the top PCB.

10. A method in accordance with claim 8, further comprising coupling a mounting plate of the retaining rail to the top surface of the mezzanine card.

11. A method in accordance with claim 8, further comprising:
    positioning a second retaining rail along a second side surface of the mezzanine card opposite the first side surface;
    inserting a first arm of the second retaining rail into the top PCB such that a notch formed in the first arm interferes with a corresponding slot formed in the top PCB; and
    positioning at least one top rail of the second retaining rail with respect to a top surface of the mezzanine card.

12. A stacked single board computer comprising:
    a first printed circuit board (PCB) and a second printed circuit board (PCB) positioned adjacent said first PCB, said first PCB comprising at least one mezzanine card that is secured by at least one retaining rail comprising:
    a main body comprising a first end, a second end opposite said first end, a first side surface, and a second side surface opposite said first side surface, said main body sized to be positioned along only one side surface of said mezzanine card, one of said first side surface and said second side surface contacting said side surface of said mezzanine card to facilitate securing said side surface of said mezzanine card with respect to said first PCB;
    a first arm formed at said first end;
    a second arm formed at said second end; and
    at least one top rail coupled to said top surface, said at least one top rail configured to secure a top surface of said mezzanine card with respect to said first PCB,
    wherein said first arm and said second arm are configured to be positioned in a substantially perpendicular direction relative to a top surface of said first PCB,
    wherein at least one of said first arm and said second arm further comprises a notch configured to engage an upper surface and a lower surface of said first PCB.

13. A stacked single board computer in accordance with claim 12, wherein at least one of said first arm of said retaining rail and said second arm of said retaining rail is integrally formed with said main body of said retaining rail.

14. A stacked single board computer in accordance with claim 12, wherein said first arm of said retaining rail is formed at a first end to said bottom surface of said retaining rail.

15. A stacked single board computer in accordance with claim 14, wherein said notch is sized to interfere with a slot formed in said first PCB in order to secure said retaining rail with respect to said first PCB.

16. A stacked single board computer in accordance with claim 12, wherein said second arm of said retaining rail is formed at a first end to said bottom surface of said retaining rail.

17. A stacked single board computer in accordance with claim 12, wherein said retaining rail further comprises a mounting plate coupled to said main body, said mounting plate configured to couple said retaining rail to said mezzanine card.

18. A stacked single board computer in accordance with claim 16, wherein said mounting plate of said retaining rail defines at least one mounting aperture sized to receive a fastener.

* * * * *